Dec. 19, 1950     C. SCHNEIDER     2,534,798
TRANSPLANTER DRILL SET

Filed Feb. 12, 1946     2 Sheets-Sheet 1

Inventor
CARL SCHNEIDER.
By Louis V. Lucia
Attorney

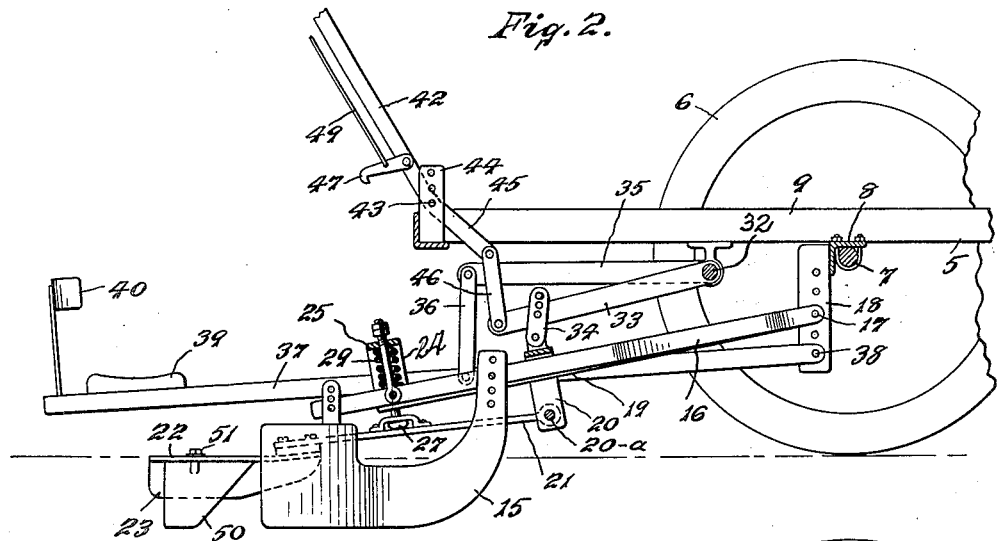
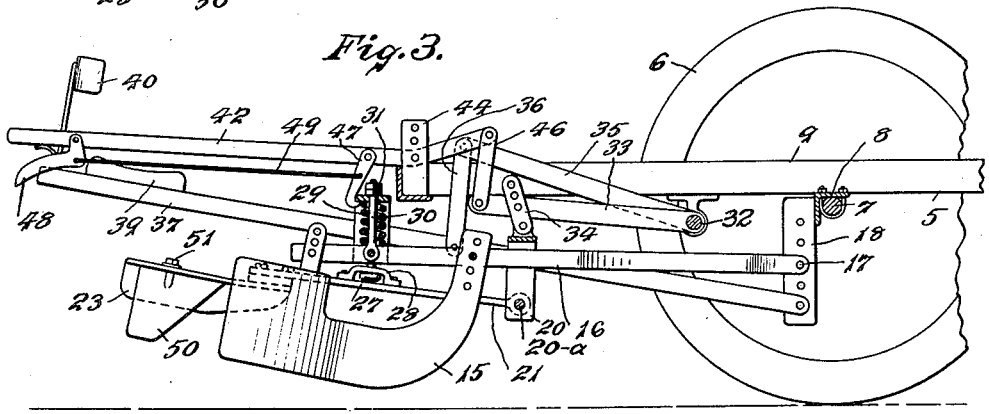
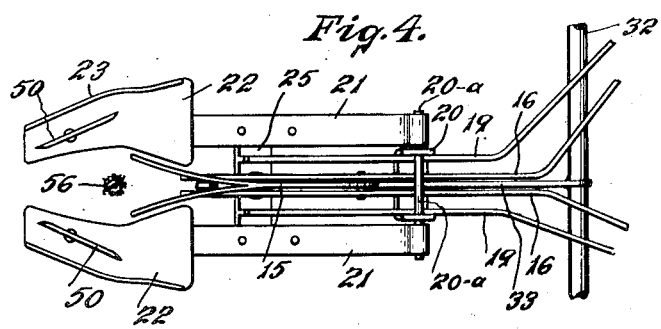
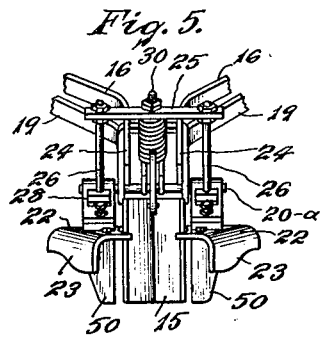
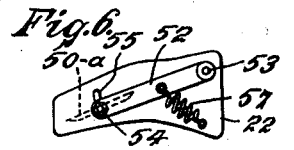
Inventor
CARL SCHNEIDER.
By Louis V. Lucia
Attorney Patented Dec. 19, 1950

2,534,798

UNITED STATES PATENT OFFICE 2,534,798

TRANSPLANTER DRILL SET

Carl Schneider, Enfield, Conn.

Application February 12, 1946, Serial No. 647,049

1 Claim. (Cl. 111—85)

This invention relates to agricultural machines and more particularly to a transplanting machine especially adapted for transplanting seedlings of such as beach grass or the like.

Transplanting machines heretofore used have not been found satisfactory for transplanting such seedlings as, for instance, beach grass, which requires deep planting in order to produce satisfactory results. Transplanting machines heretofore produced have commonly consisted of a plow share adapted to cut a groove within which there is placed, directly in back of the plow, a seedling. A pressure plate is also used for forcing the soil downwardly back into the groove. It has been found, however, that when a deep furrow is cut for transplanting seedlings requiring deep planting, the pressure plates will not force the soil with sufficient pressure near the bottom of the furrow so as to pack the soil firmly around the roots of the plant.

An object of this invention therefore, among others, is to provide a transplanting machine having suitable means for cutting a sufficiently deep furrow and for packing the soil around the roots of a plant placed upon the bottom of said furrow.

A further object of this invention is to provide a novel feature permitting the planting of a plurality of rows simultaneously by staggering the arrangement of the transplanting units to conveniently accommodate an operator for each unit which is used.

Further objects and advantages of this invention will be more clearly understood from the following description and from the accompanying drawings, in which—

Figure 2 is an enlarged side view, partially in section, of a transplanting unit used in said machine, showing the said unit in its operative position.

Figure 3 is a similar view showing the said unit in its inoperative position.

Figure 4 is a bottom plane view of soil packing means provided by my invention.

Figure 5 is a rear view thereof.

Figure 6 is a view showing a modified form of packing member.

Figure 1:
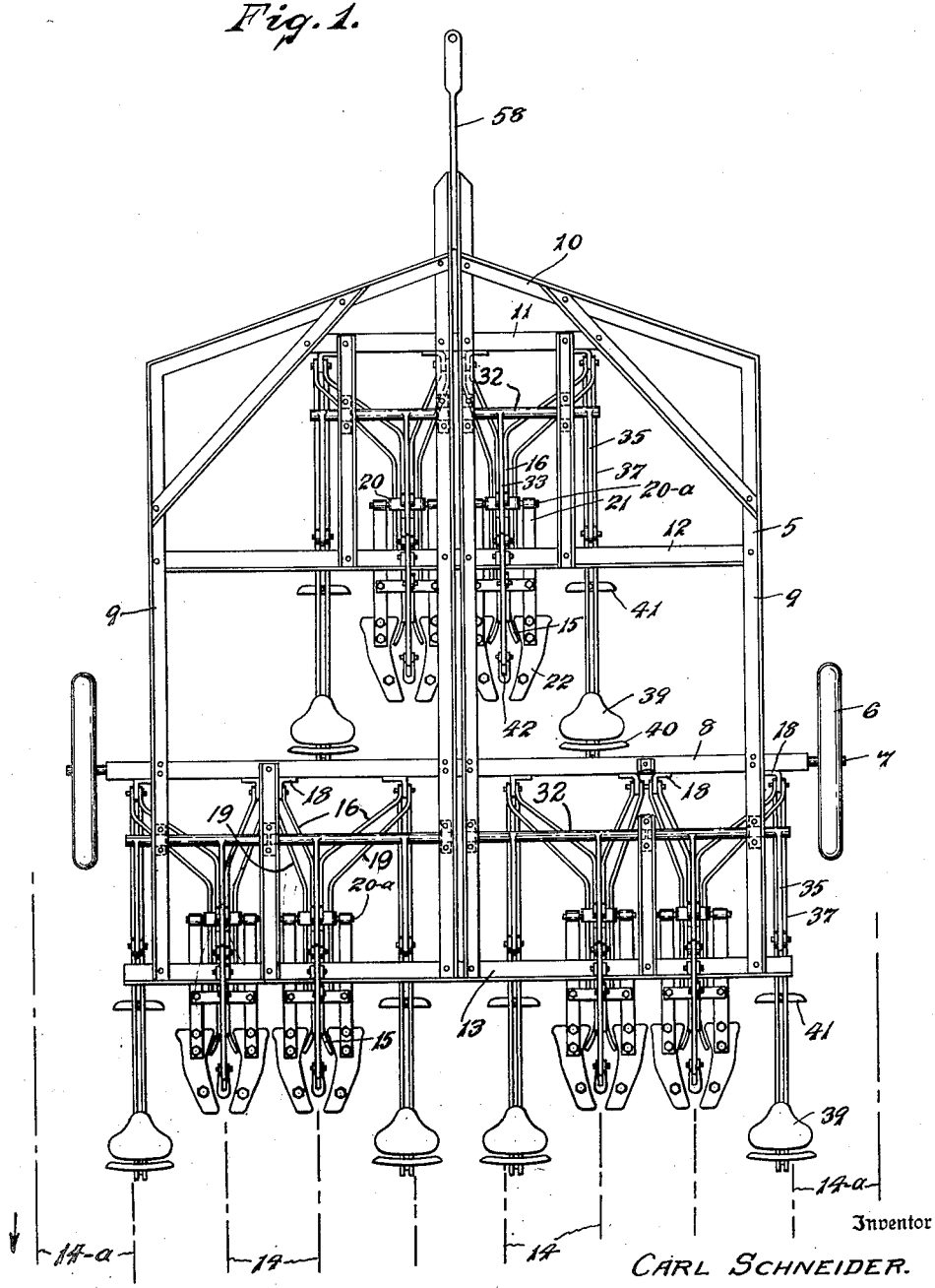
Figure 1 is an elevational plan view of a transplanting machine embodying my invention.

As shown in the drawings, my improved transplanting machine may be constructed for any practical number of transplanting units and may comprise a frame 5 which is mounted on a pair of wheels 6 that are rotatable upon an axle 7 secured to an angle bar 8 which extends across the frame. The said frame is constructed with side bars 9—9, a front bar 10, that is in two sections, and cross bars 11, 12 and 13 which, together with the axle bar 8, support the transplanting units.

As illustrated in Fig. 1, my improved machine is constructed to provide six transplanting units, each of which is arranged to permit ample room for the operator, and all of said units are arranged in tandem within the frame 5 so that the machine will transplant into six equally spaced furrows as indicated by the lines 14.

Each of the transplanting units is similarly constructed, with the exception that the operator's seat may be located either at the right or to the left of the unit. As shown, a unit consists of a plow, or furrow digger, 15 which is adjustably mounted upon bars 16 pivotally secured at 17 to spaced upright supports 18 which may either be secured to the cross bars or to the axle bar 8 and have a plurality of holes therein for selectively locating the pivot 17 on said bar to provide for adjustment of the plow 15.

A pair of parallel pressure bars 19 are also pivoted at 17 with the bars 16 and carry, secured thereto, an inverted U-shaped supporting member 20 to which a bar 20-a pivotally secures a pair of horizontal bars 21 that carry pressure plates 22. Each of said plates 22 has a flange 23 for moving soil inwardly towards the center of the furrow for packing the soil downwardly in the furrow. The said pressure bars 19 also carry a pair of upright posts 24 across the top of which there is mounted a cross bar 25. Adjustable posts 26—26 extend from the opposite ends of said bar 25 downwardly to the horizontal bars 21 and each has a head 27 which is secured under a strap 28 upon each of said bars 21. At the center of the bar 25, there is provided a pressure spring 29 which is disposed between said bar and the bars 16 which carry the plow 15. A post 30 is secured to said bars 16 and extends upwardly through the spring 29 and the bar 25 and has adjustable nuts 31 by means of which the tension of said spring may be adjusted.

As clearly illustrated in Figs. 2 and 3, there is provided for each unit a rocker shaft 32 to which there is rigidly secured a lever 33 that is secured to the member 20 by a link 34. The said rocker shaft 32 also carries an operating lever 35 which is rigidly secured thereto and is connected by means of a link 36 to a double operating bar 37 that is pivoted at 38 to one of the upright supporting bars 18. The said operating bar carries at the opposite end thereof a seat 39 which is also provided with a back rest 40 to carry the operator of the particular unit. Each of said bars 37 also carries a foot rest, or stirrup, 41 for supporting the operator's feet.

In order to move the transpanting mechanism into or out of engagement with the soil, there is provided a handle lever 42 which is adjustably pivoted at 43 to an upright 44 on the frame and has an extension 45 to which is secured a connecting link 46 which is fastened to the end of the lever 33. The said lever 42 has pivoted thereon a hook 47 which is connected to an operating handle 48 by a connecting rod 49.

In order that the soil may be firmy packed around the roots of a seedling being planted, particularly in a deep furrow, I provide, as an important element of this invention, a deflector blade 50 on each of the pressure plates 22, the said blade being preferably secured to the plate by means of a screw 51 so that it may be adjusted on said plate for the proper angle to deflect the soil in the furrow towards the center and thereby pack it against the roots of the plant.

It will be noted that the said deflector blades project downwardly for substantially an equal distance with the plow 15 so that they will reach to the bottom of the furrow.

If desired, the said plates may be mounted as shown in Fig. 6, wherein they are secured to a carrier bar 52 which is pivoted at 53 and has a blade 50-a adjustably secured thereto by means of a bolt and nut 54 which projects through a slot 55.

The operation of my improved transplanting machine as above described is as follows:

Assuming that all of the various parts have been properly adjusted for positioning, the plow 15 in conformity with the depth of the furrow which is to be cut for a particular transplanting operation, the seedlings which are to be transplanted are placed on a suitable carrier, not shown, which is mounted on the top of the frame 5 in front of the operator who sits in the seat 39 with his feet on the stirrup 41. The lever 42 is swung upwardly to rock the shaft 32 and lower the plow into operative position.

The machine is moved by a suitable drawing implement, such as a tractor, which is connected to the connecting bar 58. As the machine moves forward, the plow will cut a furrow. The operator places each seedling to be transplanted directly in back of the plow, or at the point indicated at 56 in Fig. 4, where the furrows are still open in back of the plow. As the machine moves forward, the pressure plates 22 will force the soil downwardly into the groove and the deflector 50 will deflect the soil from the side walls of the furrow, inwardly against the roots of the plant, thereby firmly packing the soil around said plant.

It will be noted that the weight of the operator sitting on the seat 39 is transmitted through the link 36, the lever 35, rocker shaft 32, the lever 33, and the link 34 to the pressure bars 19 which, through the posts 24 and horizontal bars 20-a apply said weight upon the pressure plates. Also, the said weight would be applied through the spring 29 to the bars 16 and thereby forcing the plow into the soil for the desired depth. It will be noted that while the weight of the operator is applied to the pressure plates directly, it is applied to the plow 15 indirectly through the spring 29. Thus the said plow is free to move upwardly against the pressure from said spring when it strikes an obstruction such as a stone or the like.

In the form shown in Fig. 6, the blades 50-a are yieldingly movable upon the pivots 53 so that they may also move should they strike an obstruction; the said blades, however, being drawn towards their operating position by means of the spring 57 which provides sufficient pull to normally retain the blades in their inward position.

It will be understood from the above description that I have provided a novel transplanting machine which is particularly adapted for deep planting for the reason that it is provided with means whereby the soil may be firmly packed around the roots of a seedling by side pressure applied to the soil close to the roots of the plant and by downward pressure applied by the pressure plates 22.

After the machine has been operated over the ground in one direction, the same may be operated on its return trip in the other direction, one of the wheels 6 running between the two furrows, at the edge of the strip previously planted, which furrows are indicated in Fig. 1. Thus the furrows at the edge of the new row 14-a which is being planted will be equally spaced from the outside one of the furrows 14; this being permitted by reason of the fact that the outside transplanting unit in my transplanting machine is so positioned so that it will plant a furrow one and one-half spaces away from the adjacent wheel 6 of the machine.

I claim:

In a transplanter drill set, in combination with a transversely extending frame, a pair of parallel bars extending longitudinally relative to said frame, the forward ends of said bars being pivoted on said frame, a plow carried by the rear portions of said bars, a pair of longitudinally extending pressure bars pivoted on said frame adjacent to and on opposite sides of said parallel bars, a pair of longitudinally extending support bars disposed on opposite sides of said plow, the forward ends of said support bars being pivotally connected to intermediate portions of said pressure bars, a soil-packing plate supported on the rear part of each support bar, connecting means between the rear portions of said pressure bars and each of said support bars, resilient means between the rear portions of said pressure bars and the aforesaid plow-carrying parallel bars, and means for applying pressure to said pressure bars, whereby the pressure applied to the pressure bars is transmitted through the connecting means to the support bars and plates and through the resilient means and parallel bars to the plow.

CARL SCHNEIDER.

REFERENCES CITED

The following references are of record in the file of this patent:

UNITED STATES PATENTS

| Number | Name | Date |
|---|---|---|
| 486,200 | Starks et al. | Nov. 15, 1892 |
| 519,460 | Stevens et al. | May 8, 1894 |
| 1,317,402 | Taylor | Sept. 30, 1919 |
| 1,318,365 | Erway | Oct. 14, 1919 |
| 1,504,140 | Poll | Aug. 5, 1924 |
| 1,838,535 | Dattisman | Dec. 29, 1931 |
| 1,886,457 | Winkley | Nov. 8, 1932 |
| 2,372,474 | Cox | Mar. 27, 1945 |

FOREIGN PATENTS

| Number | Country | Date |
|---|---|---|
| 564,086 | Germany | Nov. 14, 1932 |